United States Patent
Baca et al.

(10) Patent No.: US 9,829,664 B2
(45) Date of Patent: Nov. 28, 2017

(54) OPTICAL FIBER CABLE WITH IMPACT RESISTANT BUFFER TUBE

(71) Applicant: Corning Optical Communications LLC, Hickory, NC (US)

(72) Inventors: Adra Smith Baca, Hickory, NC (US); Dana Craig Bookbinder, Corning, NY (US); Manuela Ocampo, Corning, NY (US); Richard Curwood Peterson, Elmira Heights, NY (US); David Alan Seddon, Hickory, NC (US); Pushkar Tandon, Painted Post, NY (US); Brandon Robert Williamson, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/422,650

(22) Filed: Feb. 2, 2017

(65) Prior Publication Data
US 2017/0146756 A1 May 25, 2017

Related U.S. Application Data

(63) Continuation of application No. PCT/US2015/045789, filed on Aug. 19, 2015.
(Continued)

(51) Int. Cl.
*G02B 6/44* (2006.01)
*G02B 6/02* (2006.01)

(52) U.S. Cl.
CPC ......... *G02B 6/443* (2013.01); *G02B 6/02395* (2013.01); *G02B 6/4413* (2013.01); *G02B 6/4434* (2013.01)

(58) Field of Classification Search
None
See application file for complete search history.

(56) References Cited

U.S. PATENT DOCUMENTS 6,215,931 B1   4/2001   Risch et al.
6,483,971 B2   11/2002  Gaillard et al.
(Continued)

FOREIGN PATENT DOCUMENTS

EP   1550890 A1   7/2005
EP   1191375 B1   10/2006
(Continued)

OTHER PUBLICATIONS

Patent Cooperation Treaty, International Search Report and Written Opinion for PCT/US2015/045789, dated May 25, 2016, 23 pages.
(Continued)

*Primary Examiner* — Jerry Rahll
(74) *Attorney, Agent, or Firm* — William D. Doyle

(57) ABSTRACT

An crush resistant optical cable and/or crush resistant optical fiber buffer tube are provided. The cable generally includes a tube having at least one layer formed from a first material and an optical fiber located within a channel of the first tube. The buffer tube is configured to protect optical fibers from crush or impact events through a cushioning action. For example, the first material may be a polymer material having modulus of elasticity of less than 200 MPa, and the layer of the tube acts as a compliant cushioning layer at least partially contacting and surrounding an outer surface of the optical fiber when radially directed forces are applied to the outer surface of the tube.

5 Claims, 5 Drawing Sheets

Related U.S. Application Data

(60) Provisional application No. 62/040,652, filed on Aug. 22, 2014.

(56) References Cited

U.S. PATENT DOCUMENTS

| | | |
|---|---|---|
| 2002/0118933 A1 | 8/2002 | Dixon et al. |
| 2003/0123822 A1 | 7/2003 | Witt et al. |
| 2009/0087154 A1 | 4/2009 | Bradley et al. |

FOREIGN PATENT DOCUMENTS

| | | |
|---|---|---|
| EP | 2312359 A1 | 4/2011 |
| EP | 2703861 A1 | 3/2014 |
| JP | 58132202 A | 8/1983 |
| WO | 2009029300 A1 | 3/2009 |
| WO | 2010053356 A2 | 5/2010 |
| WO | 2012111959 A2 | 8/2012 |
| WO | 2013130121 A1 | 9/2013 |

OTHER PUBLICATIONS

Fluon, "Physical properties of Fluon® unfilled and filled PTFE, Technical Service Note F12/13," 1981, pp. 1-55, XP002756943, Retrieved from the Internet: URL:http://www.agcchem.com/newsroom/finish/13-fluon-ptfe-resins/46-processing-note-f12-13-physical-properties-of-unfilled-filled-ptfe [retrieved on Apr. 21, 2016].
Mitre A et al.,: "Thermal Stability of the CPC Fiber Coating System", Corning Jul. 2010 (Jul. 2010), pp. 1-7, XP002756944, Retrieved from the Internet: URL:http://www.corning.com/media/worldwide/global/documents/sfiber%20WP4250_Thermal%20Stability%20of%20the%20CPC%20Fiber%20Coating%20System_July2010.pdf [retrieved on Apr. 21, 2016].
J.C. Rose et al., "Elastomeric Alloys: A New Approach for Communication Cables," IWCS Proceedings 1986.

OPTICAL FIBER CABLE WITH IMPACT RESISTANT BUFFER TUBE

RELATED APPLICATIONS

This application is a continuation of International Application No. PCT/US2015/045789, filed on Aug. 19, 2015, which claims the benefit of priority under 35 U.S.C. §119 of U.S. Provisional Application No. 62/040,652, filed on Aug. 22, 2014, the content of which is relied upon and incorporated herein by reference in its entirety.

BACKGROUND

The disclosure relates generally to optical communication cables and more particularly to optical communication cables including an optical fiber containing tube formed from a low modulus or otherwise supportive material that may act to cushion and protect optical fibers during impact, deformation or crush events. Optical communication cables have seen increased use in a wide variety of electronics and telecommunications fields. Optical communication cables contain or surround one or more optical communication fibers. The cable provides structure and protection for the optical fibers within the cable. Within a cable, optical fibers may be located within a polymer tube, such as a buffer tube.

SUMMARY

One embodiment of the disclosure relates to a crush resistant optical cable. The cable includes a cable body including an inner surface defining a channel within the cable body. The cable includes a core element located in the channel of the cable body. The core element includes a tube including an outer surface, an inner surface and a channel defined by the inner surface of the tube. The tube includes a first layer formed from a first material, and the first layer defines the inner surface of the tube. The cable includes an optical fiber located within the channel of the tube. The first layer is formed from a polymer material having modulus of elasticity of less than 100 MPa such that the first layer acts as a compliant cushioning layer at least partially contacting and surrounding an outer surface of the optical fiber when radially directed forces are applied to the outer surface of the tube.

An additional embodiment of the disclosure relates to an optical cable. The optical cable includes a cable body having an inner surface defining a channel within the cable body. The cable includes a plurality of tubes each including an outer surface, an inner surface and a channel defined by the inner surface of the tube. Each tube includes a first layer formed from a first polymer material, and the first layer defines the inner surface of the tube. The cable includes a plurality of optical fibers located within the channel of each tube. Each optical fiber includes an optical core surrounded by cladding of a different refractive index than the optical core, and the cladding is surrounded by a fiber coating layer. The first polymer material has a modulus of elasticity that is less than the modulus of elasticity of the material of the fiber coating layer.

An additional embodiment of the disclosure relates to a crush resistant optical fiber buffer tube. The buffer tube includes an outer surface, an inner surface, a channel defined by the inner surface, and a first layer formed from a first material. The first layer defines the inner surface. The buffer tube includes a plurality of optical fibers located within the channel. Each optical fiber includes an optical core surrounded by cladding of a different refractive index than the optical core, and the cladding is surrounded by a fiber coating layer. The first material has a modulus of elasticity that is less than 100 MPa, and the modulus of elasticity of the material of the fiber coating layer is greater than 1000 MPa. A total radial thickness of the buffer tube between the inner surface and the outer surface is between 0.25 mm and 0.5 mm, and a radial thickness of the first layer is at least 30% of the total radial thickness of the buffer tube.

Another embodiment of the disclosure relates to an impact resistant optical cable. The cable includes a cable body having an inner surface defining a channel within the cable body. The cable includes a core element located in the channel of the cable body. The core element includes a tube including an outer surface, an inner surface and a channel defined by the inner surface of the tube, and the tube includes a first layer formed from a polymer material, the first layer defining the inner surface of the tube. The core element includes at least one coated optical fiber located within the channel of the tube. The tube is configured such that an impact on the tube results in a force imparted by the tube on the at least one coated optical fiber corresponding to the impaction parameter $\rho$ (rho) of less than or equal to 2800 $m^{-1}$.

Another embodiment of the disclosure relates to an impact resistant optical cable including a cable body including an inner surface defining a channel within the cable body. The cable includes a core element located in the channel of the cable body. The core element includes a tube having an outer surface, an inner surface and a channel defined by the inner surface of the tube, and the tube has a first layer defining the inner surface of the tube. The core element has at least one coated optical fiber located within the channel of the tube. The first layer is formed from a polymer material and includes a Maxwell element, and the response time of the Maxwell element of the polymer material of the tube ($C_2/K_2$) is less than or equal to 1 sec.

Another embodiment of the disclosure relates to an impact resistant optical cable including a cable body including an inner surface defining a channel within the cable body. The cable includes a core element located in the channel of the cable body. The core element includes a tube having an outer surface, an inner surface and a channel defined by the inner surface of the tube, and the tube has a first layer defining the inner surface of the tube. The core element includes at least one coated optical fiber located within the channel of the tube. The first layer is formed from a polymer material and includes a Kelvin element, and the response time of the Kelvin element of the tube material ($C_1/K_1$) is less than or equal to 1 sec.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Figure 1:
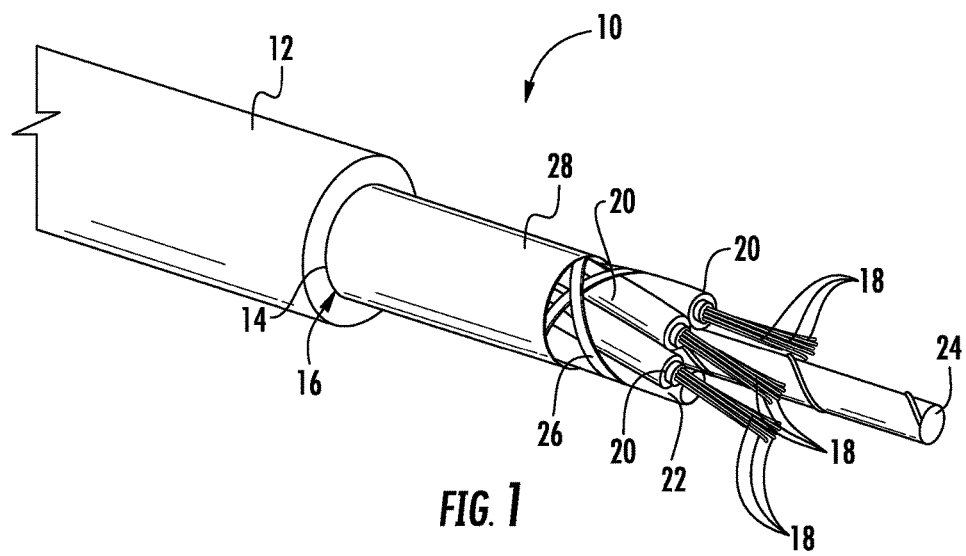
FIG. 1 is a perspective view of an optical fiber cable according to an exemplary embodiment.

Referring generally to the figures, various embodiments of an optical communication cable (e.g., a fiber optic cable, an optical fiber cable, etc.) and an optical fiber carrying tube are shown. In general, the cable embodiments disclosed herein include one or more optical fiber containing core elements. In various embodiments, the optical fiber containing core elements include a tube (e.g., a buffer tube) surrounding one or more optical transmission elements (e.g., optical fiber) located within the tube. In general, the buffer tube acts to protect the optical fibers under the wide variety of forces that the cable may experience during manufacture, installation, handling, in use, etc.

In particular, the forces the cable may experience include compression loading experienced during or following installation (e.g., compression bending, radial crush, etc.). For example, the cable may experience rapid high force, short duration loading events (e.g., impact events), such as forces that impact the cable as the cable is being pulled around corners, mandrels, shims, etc. during installation. During certain installation, these high force, short duration impacts occur repeatedly at intervals along the length of the cable (which can be kilometers in length) as the cable is run to the desired position for installation. Thus, it is believed that by providing a buffer tube formed from one or more materials with elastic and/or viscous properties specifically identified as discussed herein, improved fiber protection with the buffer tube can be achieved even under high force, short duration impact events. Applicant has found that buffer tubes formed from materials having the properties discussed herein have a time response under short duration or impact loading that allows the buffer tube to transfer/absorb energy from the impact event, and thereby protects the optical fibers. For example, it is believed that by using the buffer tube embodiments discussed herein to cushion optical fibers during crush or impact events, the optical fibers and the outer coating of optical fibers, particularly at the fiber cross-overs, are protected, and damage is resisted or prevented which in turn may decrease the signal attenuation experienced within the optical fiber following the crush or impact events.

In various embodiments disclosed herein, the buffer tubes include one or more layer of a rubbery, compliant, elastic and/or viscoelastic material that acts to cushion the optical fibers within the tube during radial or compression loading, such as short duration impact events. In these embodiments, the compliant material of the buffer tube deforms and envelops the optical fibers during loading protecting the optical fibers. Because the material of the buffer tubes discussed herein have response times to loading that allows the buffer tube to absorb and/or transfers energy under short duration, impact loading, the buffer tubes discussed herein are particularly well suited to protecting optical fibers from the impact events common during installation. Further, in at least some embodiments, once the loading is removed the elastic buffer tube material returns substantially to its original shape.

In at least some embodiments, the buffer tubes of the present disclosure utilize a material having a relatively low modulus of elasticity to cushion optical fibers rather than utilizing the relatively hard materials typical in conventional buffer tubes. In various embodiments, the elasticity and/or hardness of the compliant buffer tube material is selected to provide sufficient protection to optical fibers, while still providing sufficient structure for handling and processing during cable manufacturing. Further, in some embodiments, the viscosity of the material of the buffer tube is selected to ensure sufficient time response under short duration or impact loading such that the buffer tube can transfer or absorb energy under such loading, thereby protecting the optical fibers. In some embodiments, the buffer tubes are formed from a material having a combination of elasticity and viscosity within specifically identified ranges (discussed herein) that Applicant has identified as providing satisfactory protection to optical fibers from impact events. In addition, the thickness of the compliant layer of the buffer tube is selected to allow the compliant material to envelop and at least partially surround the optical fibers during compression and/or under impact.

In specific embodiments, the compliant material of the buffer tube forms an inner, fiber contacting layer to provide cushioning during radial loading, and the buffer tube includes an outer more rigid layer located outside of the inner fiber contacting layer. In various embodiments, the outer layer is substantially more rigid than the inner layer. In such embodiments, the outer rigid layer provides structure during buffer tube storage, buffer tube handling during cable construction, etc., and the inner layer provides protection to the fibers.

Referring to FIG. 1, an optical cable, shown as cable 10, is shown according to an exemplary embodiment. Cable 10 includes a cable body, shown as cable jacket 12, having an inner surface 14 that defines a channel, shown as central bore 16. A plurality of optical transmission elements, shown as optical fibers 18, are located within bore 16. In various embodiments, the optical fibers 18 can include a wide variety of optical fibers including multi-mode fibers, single mode fibers, bend insensitive fibers, multi-core optical fibers, etc. Generally, cable 10 provides structure and protection to optical fibers 18 during and after installation (e.g., protection during handling, protection from elements, protection from vermin, etc.).

In the embodiment shown in FIG. 1, cable 10 includes a plurality of core elements located within central bore 16. A first type of core element is an optical transmission core element, and these core elements include bundles of optical fibers 18 that are located within tubes, shown as buffer tubes 20. One or more additional core elements, shown as filler rods 22, may also be located within bore 16. Filler rods 22 and buffer tubes 20 are arranged around an elongate rod, shown as central strength member 24, that is formed from a material such as glass-reinforced plastic or metal (e.g., steel).

In the embodiment shown, filler rods 22 and buffer tubes 20 are shown in a helical stranding pattern, such as an SZ stranding pattern, around central strength member 24. Helically wound binders 26 are wrapped around buffer tubes 20 and filler rods 22 to hold these elements in position around strength member 24. In some embodiments, a thin-film, extruded sheath may be used in place of binders 26. A barrier material, such as water barrier 28, is located around the wrapped buffer tubes 20 and filler rods 22. In various embodiments, cable 10 may include a reinforcement sheet or layer, such as a corrugated armor layer, between layer 28 and jacket 12, and in such embodiments, the armor layer generally provides an additional layer of protection to optical fibers 18 within cable 10, and may provide resistance against damage (e.g., damage caused by contact or compression during installation, damage from the elements, damage from rodents, etc.). In some embodiments, designed for indoor applications, cable 10 may include fire resistant materials, such as fire resistant materials embedded in jacket 12 and/or fire resistant intumescent particles located within channel 16.

Figure 2:
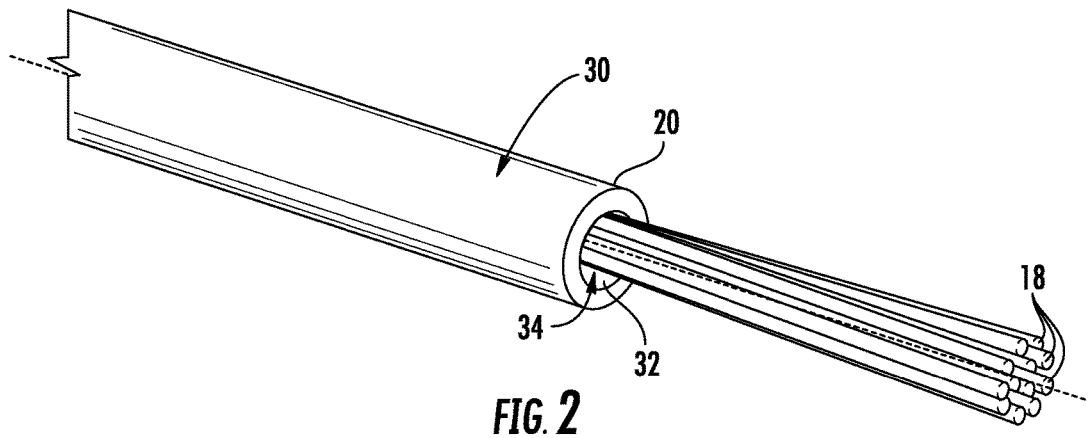
FIG. 2 is a perspective view of a core element of the cable of FIG. 1 according to an exemplary embodiment.

Referring to FIG. 2, a buffer tube 20 and optical fibers 18 are shown according to an exemplary embodiment. Buffer tube 20 includes an outer surface 30 that defines the exterior surface of the buffer tube and an inner surface 32 that defines a channel, shown as central bore 34. Optical fibers 18 are located within central bore 34. In various embodiments, optical fibers 18 may be loosely packed within buffer tube 20 (e.g., a "loose buffer"), and in such embodiments, cable 10 is a loose tube cable. In various embodiments, central bore 34 may include additional materials, including water blocking materials, such as water swellable gels.

In general, as noted above, in various embodiments, buffer tube 20 includes at least one layer of compliant, rubbery, elastic or viscoelastic material that acts to cushion optical fibers 18 within buffer tube 20. In various embodiments, the compliant material of buffer tube 20 is located such that it is the compliant material of buffer tube 20 that defines inner surface 32. In this manner, the compliant material forms the surface that directly contacts and engages optical fibers 18 under compression, crush, impact or other radially directed forces a buffer tube may experience.

Figure 3:
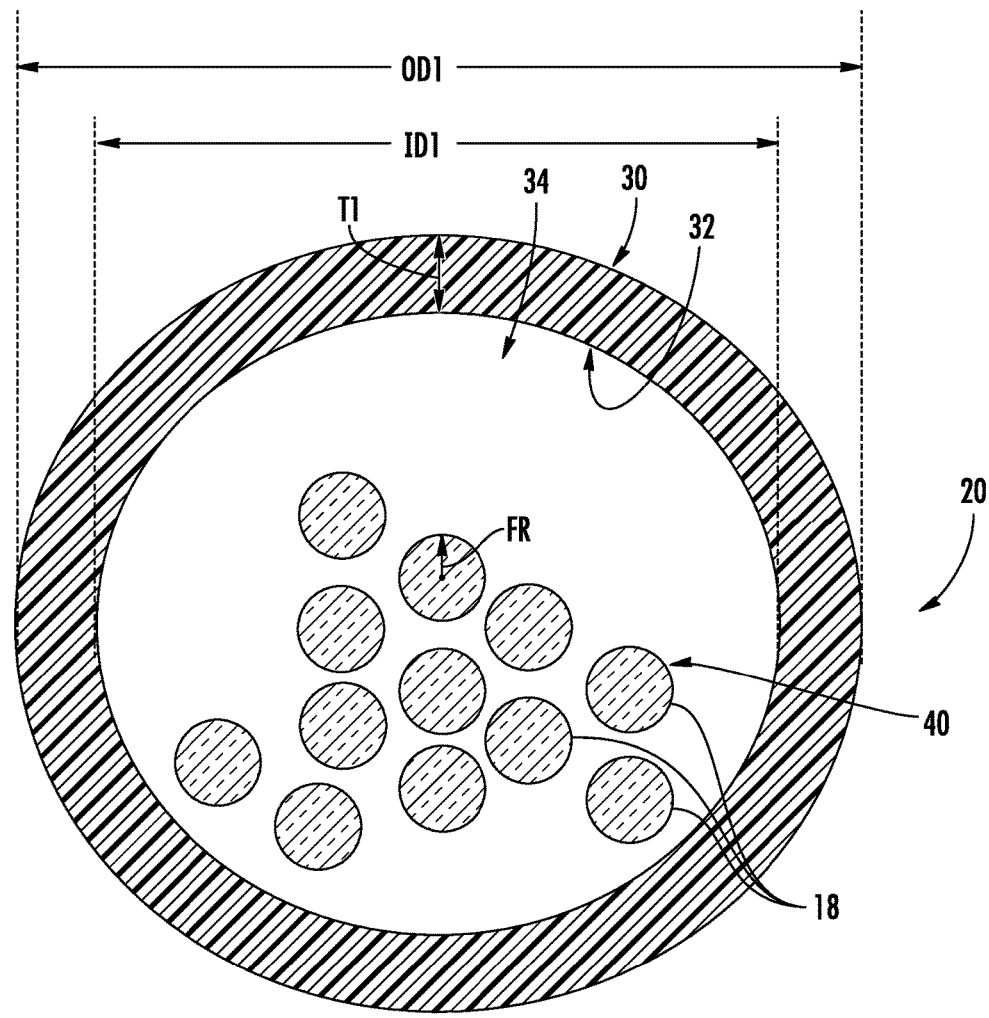
FIG. 3 is a cross-sectional view of the buffer tube of FIG. 2 according to an exemplary embodiment.

Referring to FIG. 3, a cross-sectional view of buffer tube 20 is shown according to an exemplary embodiment. In the embodiment of FIG. 3, buffer tube 20 is formed from a single layer of compliant polymer material. In this embodiment, buffer tube 20 is formed from a substantially continuous and contiguous, single extruded polymer layer that defines both outer surface 30 and inner surface 32 of buffer tube 20. FIG. 3 generally shows buffer tube 20 in the relaxed state (e.g., without substantial radial loading), and as can be seen, prior to radial loading, buffer tube 20 is a generally cylindrical tube.

Figure 4:
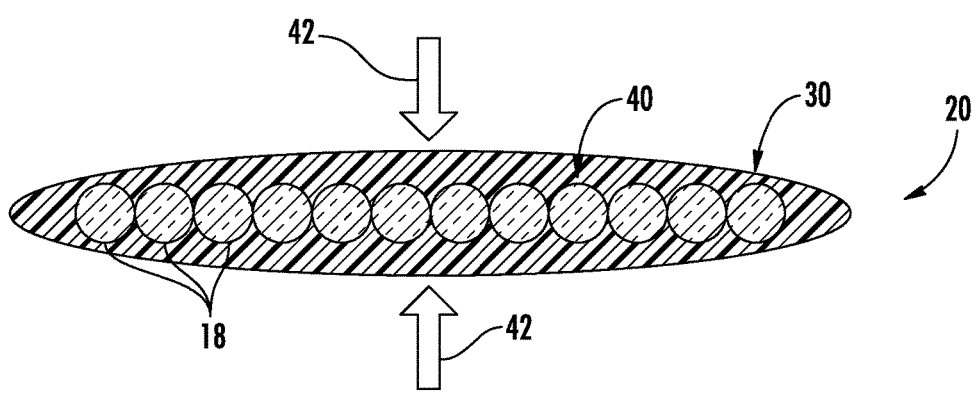
FIG. 4 is a cross-sectional view of the buffer tube of FIG. 3 showing deformation under radial loading according to an exemplary embodiment.

Referring to FIG. 4, buffer tube 20 is shown under radial loading, represented by arrows 42. When buffer tube 20 experiences a crush event, impact, compression or other radial loading, represented schematically as force 42, the compliant material of buffer tube 20 deforms and at least partially envelops optical fibers 18. Thus, under forces 42, inner surface 32 of buffer tube 20 engages at least a portion of outer fiber surface 40 and generally deforms conforming to the shape of optical fibers 18. The deformation of tube 20 from the cylindrical shape shown in FIG. 3 to the elliptical shape of FIG. 4 may act to absorb some of the forces 42 experienced by buffer tube 20, and by enveloping optical fibers 18, the compliant material of buffer tube 20 acts to transfer at least a portion of forces 42 around optical fibers 18 rather than imparting the forces entirely to fibers 18 which may otherwise cause fiber damage. In addition, it is believed that compliant nature of the material of buffer tube 20 allows more room for the fibers during crush events and dissipates external force due to the compliance of buffer tube 20 even at high compression rates. As discussed in more detail below, Applicant has determined (via the modeling discussed below) that in certain embodiments, forming buffer tube 20 from a viscoelastic material with the identified ranges of elasticity and viscosity, buffer tube 20 is able to envelop optical fibers 18 and dissipate energy even during short duration, high load, impact events of the sort experienced during installation. Because of the elastic nature of the material of buffer tube 20, once forces 42 are removed, buffer tube 20 returns to the shape as generally shown in FIG. 3 with little or no permanent deformation.

In various embodiments discussed herein, buffer tube 20 is structured by relative sizing, by material type and/or by material properties to protect optical fibers 18 during various types of radial loading. For example in various embodiments, buffer tube 20 is formed from a compliant, elastic material of sufficient strength and rigidity to protect optical fibers 18 while also allowing buffer tubes 20 to be stored and handled during construction of an optical cable. In one embodiment, buffer tube 20 is formed from a rubber like polymer that is capable of recovering from large deformations quickly, and in a specific embodiment, buffer tube 20 is formed from a material that retracts within 1 minute to less than 1.5 times its original length after being stretched at room temperature to twice its length and held for 1 minute before release.

In various embodiments, buffer tube 20 is formed from a material having a relatively low modulus of elasticity (e.g., as compared to the materials typically used for buffer tube construction). In various embodiments, buffer tube 20 is made from a material and specifically, a polymer material, having a modulus of elasticity of less than 200 MPa or having a modulus of elasticity of less than 100 MPa. In other embodiments, buffer tube 20 is made from a polymer material having a modulus of elasticity of less than 30 MPa, specifically less than 10 MPa and more specifically less than 5 MPa. In various embodiments, buffer tube 20 is formed from a linear material having a modulus of elasticity of less than 100 MPa. In various embodiments, each modulus of elasticity of the different materials discussed herein is the modulus in the elastic region of the material. In various embodiments, buffer tube 20 is made from a material with a stress-strain multiplier below 0.5 (for example for use of a non-linear material similar to polypropylene to form buffer tube 20). In various embodiments, it is believed based on various test data, that a buffer tube 20 formed from a material having one or more of the physical properties discussed herein will protect the fiber (and fiber coating in particular) from damage even under relatively high compression forces (e.g., 24 N per millimeter of fiber length).

In various embodiments, buffer tube 20 is formed from a material having a relatively low hardness (e.g., as compared to the materials typically used for buffer tube construction). In various embodiments, buffer tube 20 is made from a material and specifically, a polymer material, having a Shore hardness between 40A and 40D. In various embodiments, the material of buffer tube 20 has a low compression set and is extrudable. In various embodiments, buffer tube 20 is made from a material having a compression set of less 25% as determined by the test method defined in ASTM D395.

In various embodiments, buffer tube 20 is formed from a material that can be deformed substantially while still returning to its original shape with little or no permanent deformation. In various embodiments, the material of buffer tube 20 has a relatively high percent elongation at the yield point of the material. In various embodiments, the material of buffer tube 20 has a percent elongation at the yield point of greater than 30%, specifically greater than 40% and more specifically of 50%.

In various embodiments, buffer tube 20 may be formed from a wide variety of materials with physical properties as discussed herein. In various embodiments, buffer tube 20 may be formed from an extrudable polymer material with physical properties as discussed herein. In various embodiments, buffer tube 20 may be formed from a rubber-like polymer material having with physical properties as discussed herein. In specific embodiments, buffer tube 20 may be formed from a thermoplastic elastomer material or a thermoplastic urethane material. The morphological differences between thermoplastic elastomers and thermoset rubbers, copolymers with rubbery phases or other materials with high elongation are the presence of soft rubbery phases or blocks bonded into hard plastic domains or blocks with distinct melting points. This allows thermoplastic elastomers to be processed using conventional thermoplastic methods and equipment such as extrusion or injection molding. The thermoplastic elastomers behave like a vulcanized rubber up until the point where external stress is applied past the strain point for permanent deformation (due to loss of bonding between hard and soft blocks). Thus, it is believed for at least these reasons, various thermoplastic elastomer materials, as discussed herein, have suitable physical characteristics for protecting optical fibers 18 during crush events.

In a specific embodiment, buffer tube 20 may be formed from an elastomeric PVC material. In various embodiments, the polymer material of buffer tube 20 may be a thermoplastic elastomer material from the following polymer classes: block copolymers, thermoplastic olefins, such as Vistaflex and Telcar, elastomeric alloys, such as Santoprene and Alcryn, polyamides, such as Pebax and Vestamid, polyurethanes, such as Texin and Pellethane, copolyesters, such as Arnitel or Hytrel, or styrenics, such as Kraton and Finneprene. In other embodiments, buffer tube 20 may be formed from any class of thermoplastic elastomer material having one or more of the physical properties discussed herein.

In various embodiments, buffer tube 20 is sized to provide sufficient protection to optical fibers 18. In general, by utilizing a cushioning, elastic material for buffer tube 20, buffer tubes 20 may be thinner and/or smaller than is typical while maintaining sufficient crush-performance. In the embodiment shown in FIG. 3, buffer tube 20 has a thickness shown as T1, an outer diameter, shown as OD1, and an inner diameter, shown as ID1. In various embodiments, prior to distortion under radial forces, T1 of buffer tube 20 is between 0.25 mm and 0.5 mm, specifically between 0.3 mm and 0.4 mm and more specifically about 0.35 mm (e.g., 0.35 mm plus or minus 0.01 mm). In some embodiments, prior to distortion under radial forces, T1 of buffer tube 20 is less than 0.75 mm, specifically between 0.1 mm and 0.75 mm, more specifically between 0.4 mm and 0.6 mm and even more specifically about 0.5 mm (e.g., 0.5 mm plus or minus 0.01 mm). As shown in FIG. 3, prior to distortion under radial forces, OD1 of buffer tube 20 is between 1.5 mm and 3.5 mm, specifically between 1.8 mm and 2.4 mm, and more specifically is between 2 mm and 2.25 mm. In addition, prior to distortion under radial forces, ID1 of buffer tube 20 is between 1.2 mm and 1.9 mm, specifically between 1.5 mm and 1.7 mm and more specifically between 1.55 mm and 1.6 mm.

Figure 5:
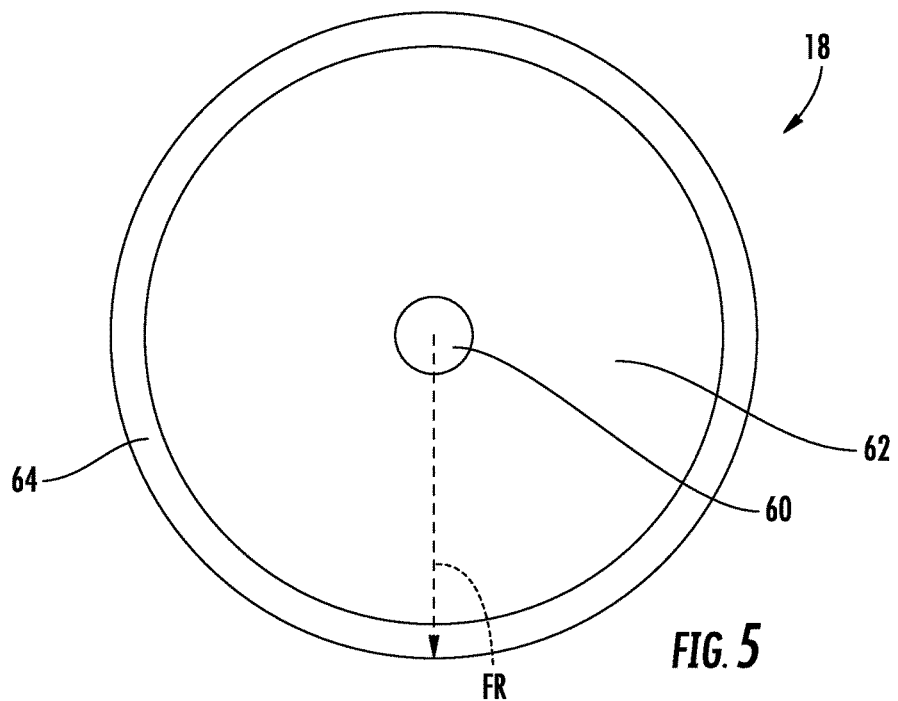
FIG. 5 is a cross-sectional view of an optical fiber of the core element of FIG. 2 according to an exemplary embodiment.

In various embodiments, the thickness T1 of buffer tube 20 and/or the modulus of elasticity of the cushioning material of buffer tube 20 may be described relative to the size and material properties of optical fibers 18. Referring to FIG. 5, an exemplary embodiment of an optical fiber 18 is shown. In various embodiments, each optical fiber 18 has an optical core 60 surrounded by a cladding layer 62 that may be formed from one or more layers of cladding material. Cladding layer 62 has a different refractive index than optical core 60 and helps guide light down optical core 60 of the optical fibers by total internal reflection. In addition each optical fiber 18 includes at least one polymer fiber coating layer 64 surrounding cladding layer 62. In various embodiments, each optical fiber 18 has a fiber radius, shown as FR, that is the radial distance from the center point of optical core 60 to an outer most surface of fiber coating layer 64. In various embodiments, FR of optical fiber 18 is between 75 micrometers and 175 micrometers, specifically between 100 micrometers and 140 micrometers and more specifically about 121 micrometers (e.g., 121 micrometers plus or minus 1%). In various embodiments, polymer fiber coating layer 64 may be a UV cured polymer material such as an acrylate material. In a specific embodiment, optical fiber 18 is 242 micrometer diameter CPC6i available from Corning, Inc. coated fiber.

In various embodiments, T1 of buffer tube 20 is selected such that buffer tube 20 provides sufficient cushioning to optical fibers 18 under radial loading. In one embodiment, T1 of buffer tube 20 is greater than FR such that buffer tube 20 is permitted to substantially or completely envelop fibers 18 under loading. In various embodiments, T1 is at least 1.5 times FR, is at least 2 times FR, at least 5 times FR and at least than 10 times FR. In a specific embodiment, T1 is greater than 1.5 times the diameter of optical fiber 18, and more specifically is greater than 2 times the diameter of optical fiber 18.

As noted above, optical fiber 18 may include polymer fiber coating layer 64 located toward the outside of the cladding layer surrounding the optical core. In various embodiments, the material of buffer tube 20 has a modulus of elasticity that is lower than the polymer fiber coating. In various embodiments, the polymer fiber coating layer 64 has a modulus of elasticity greater than 500 MPa, specifically greater than 1000 MPa and more specifically greater than 1500 MPa. In specific embodiments, the polymer fiber coating layer 64 includes an inner layer of material having a low modulus of elasticity (e.g., less than 5 MPa, less than 0.5 MPa) and an outer layer of material having a high modulus of elasticity (e.g., greater than 500 MPa, greater than 1000 MPa, greater than 1500 MPa).

Referring to FIG. 3, as noted above, optical fibers 18 are generally loosely packed within buffer tube 20 (e.g., a "loose buffer"). In such embodiments, the cross-sectional area of buffer tube channel 34 is substantially larger than the cross-sectional area occupied by fibers 18 within tube 20. In various embodiments, the cross-sectional area of buffer tube channel 34 is at least twice the size of the cross-sectional area occupied by fibers 18 within tube 20. Thus, in contrast to an optical fiber ribbon design, buffer tube 20 utilizes a compliant polymer buffer tube 20 while at the same time providing optical fibers loosely within the buffer tube.

Figure 6:
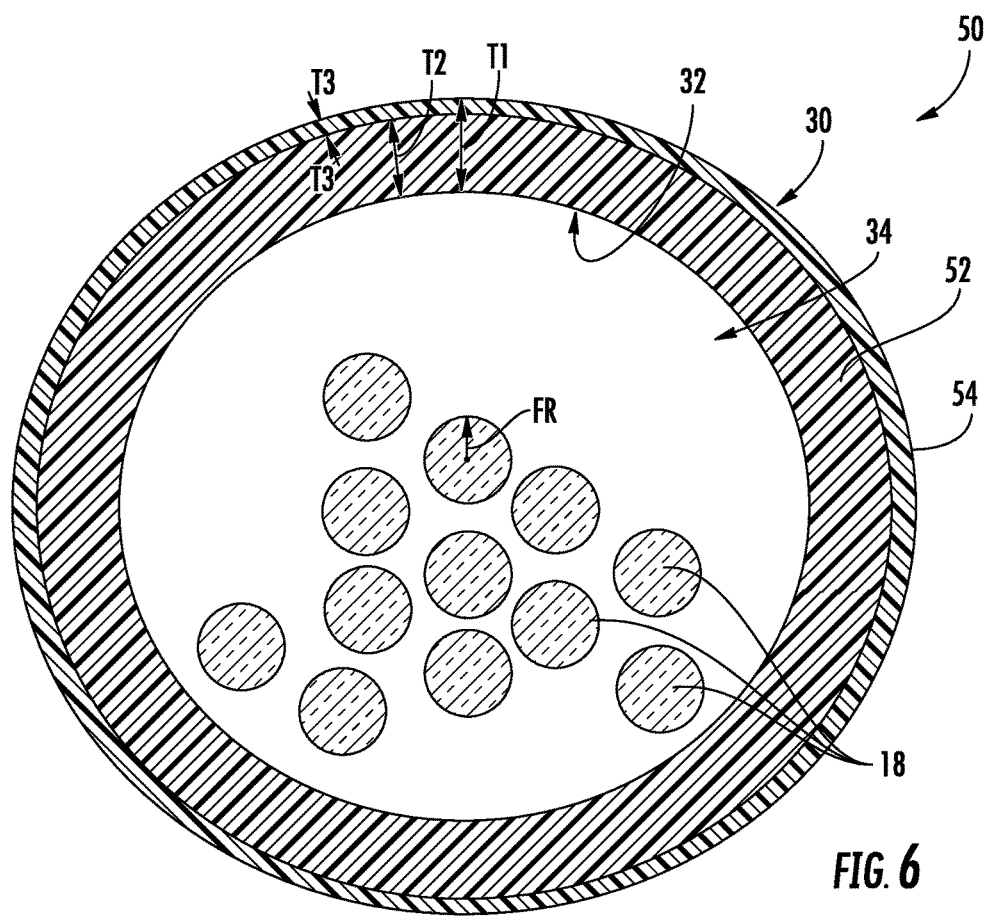
FIG. 6 is a cross-sectional view of a buffer tube according to another exemplary embodiment.

Referring to FIG. 6, a buffer tube 50 is shown according to another exemplary embodiment. Buffer tube 50 is substantially the same as buffer tube 20 except as discussed herein. In contrast to buffer tube 20, buffer tube 50 has multiple layers of material forming buffer tube 50. In the embodiment shown, buffer tube 50 has a first layer, shown as inner layer 52, and a second layer, shown as outer layer 54. In this embodiment, inner layer 52 includes an inner surface that defines buffer tube inner surface 32, and outer layer 54 includes an outer surface that defines buffer tube outer surface 30. As shown, inner layer 52 is a substantially contiguous and continuous layer of material surrounding optical fibers 18, and outer layer 54 is a substantially contiguous and continuous layer of material located outside of and surrounding inner layer 52. In the two-layer embodiment of FIG. 6, inner layer 52 and outer layer 54 combined define the radial thickness of buffer tube 50 which is the same as T1 of buffer tube 20 discussed above.

In general, because inner layer 52 defines the inner surface of buffer tube 50 and will contact optical fibers 18 under loading, inner layer 52 is formed from any of the compliant, elastic and protective materials discussed above regarding buffer tube 20. In such embodiments, outer layer 54 may be made from a relatively hard and inelastic material as compared to inner layer 52. In such embodiments, inner layer 52 provides the crush protection to optical fibers 18 while outer layer 54 provides structure and rigidity to facilitate storage and handling of buffer tube 50. It should be understood that in other embodiments, buffer tube 50 may include more than two layers, and in such embodiments, the inner most layer is a cushioning elastic layer similar to inner layer 52 discussed herein.

In various embodiments, outer layer 54 is formed from an extrudable polymer material. In various embodiments, outer layer 54 is made from a material and specifically, a polymer material, having a modulus of elasticity of greater than 500 MPa. In other embodiments, outer layer 54 is made from a polymer material having a modulus of elasticity of greater than 1000 MPa. Thus, in various embodiments, outer layer 54 may be made from a material having a modulus of elasticity that is 10 times greater than the modulus of inner layer 52, that is 50 times greater than the modulus of inner layer 52, that is 100 times greater than the modulus of inner layer 52 or that is 200 times greater than the modulus of inner layer 52. In various embodiments, inner layer 52 and outer layer 54 may be coextruded layers.

In various embodiments, outer layer 54 may also be formed from a material that is harder than the material of inner layer 52. In various embodiments, the material of outer layer 54 has a Rockwell hardness greater than or equal to 80.

In various embodiments, outer layer 54 may be made from any polymer suitable for buffer tube construction having the physical properties discussed above. In one embodiment, outer layer 54 is formed from a polypropylene material. In another embodiment, outer layer 54 is formed from a polycarbonate (PC) material. In other embodiments, outer layer 54 is formed from one or more polymer material including polybutylene terephthalate (PBT), polyamide (PA), polyoxymethylene (POM), poly(ethene-co-tetrafluoroethene) (ETFE), etc. In various embodiments, inner layer 52 is formed from a material that forms a bond with the material of outer layer 54 during coextrusion. In embodiments in which outer layer 54 is a polyolefin, such as polypropylene, inner layer 52 may be formed from a thermoplastic olefin material or an elastomeric alloy material to facilitate bonding during coextrusion.

Referring to FIG. 6, inner layer 52 has a thickness in the radial direction, shown as T2, and outer layer 54 has a thickness in the radial direction, shown as T3. As noted above, T2 and T3 together account for the total thickness, T1, as discussed above. In various embodiments, T2 is greater than or equal to T3. In various embodiments, T2 is at least 30% of T1. In various embodiments, T2 is between 30% and 90% of T1. In a specific embodiment, T2 and T3 are substantially equal (e.g., within 10% of each other).

In various embodiments, T2 is selected to provide sufficient protection to optical fibers 18. In one embodiment, T2 is greater than FR of optical fibers 18 such that inner layer 52 of buffer tube 50 is permitted to substantially or completely envelop fibers 18 under loading. In various embodiments, T2 is at least 2 times FR, at least 5 times FR and at least 10 times FR.

Referring back to FIG. 1, in various embodiments, cable jacket 12 may be formed from multiple layers similar to buffer tube 50. In a specific embodiment, cable jacket 12 may have an inner layer that defines inner surface 14 and an outer layer that defines the outer surface of cable jacket 12. In one such embodiment, the inner layer of cable jacket 12 is formed from the same material as inner layer 52 of buffer tube 50, and the outer layer of cable jacket 12 is formed from the same material as outer layer 54 of buffer tube 50. In such embodiments, the multilayer cable jacket 12 provides additional crush resistance to cable 10.

In various embodiments, cable jacket 12 may be a made from a wide variety of materials used in cable manufacturing such as medium density polyethylene, polyvinyl chloride (PVC), polyvinylidene difluoride (PVDF), nylon, polyester or polycarbonate and their copolymers. In addition, the material of cable jacket 12 may include small quantities of other materials or fillers that provide different properties to the material of cable jacket 12. For example, the material of cable jacket 12 may include materials that provide for coloring, UV/light blocking (e.g., carbon black), burn resistance, etc.

Figure 7:
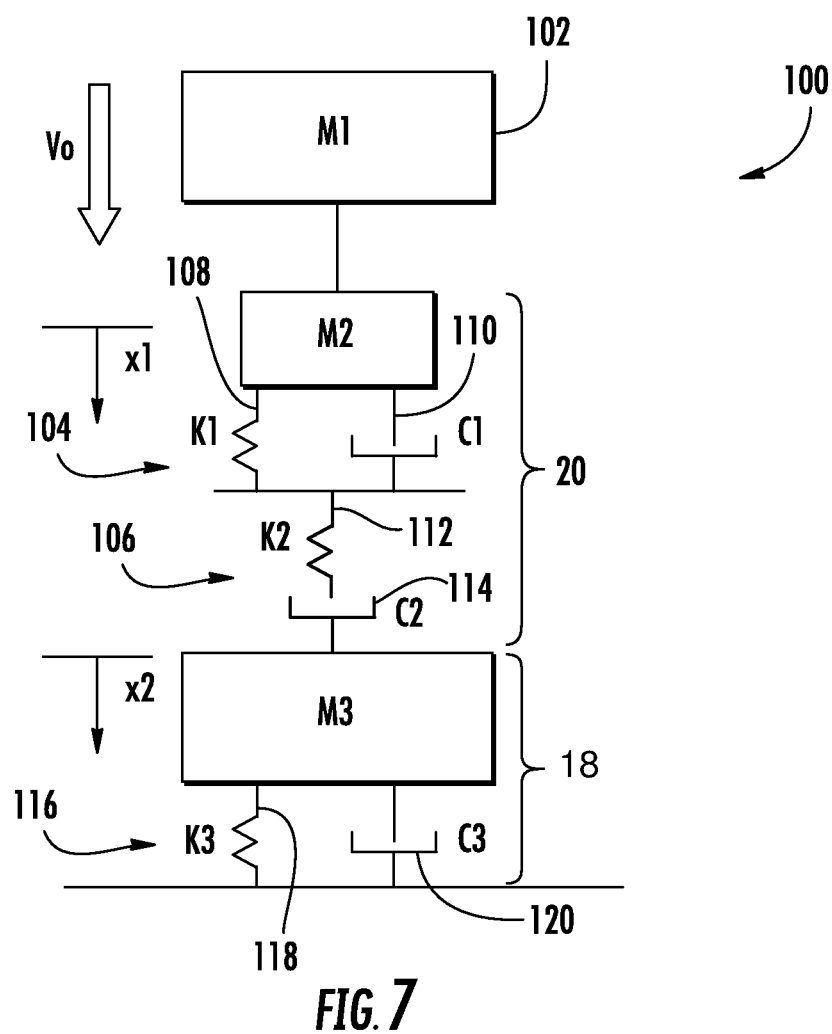
FIG. 7 is a diagram of a model of an impact resistant buffer tube and a coated optical fiber under impact according to an exemplary embodiment.
Figure 8:
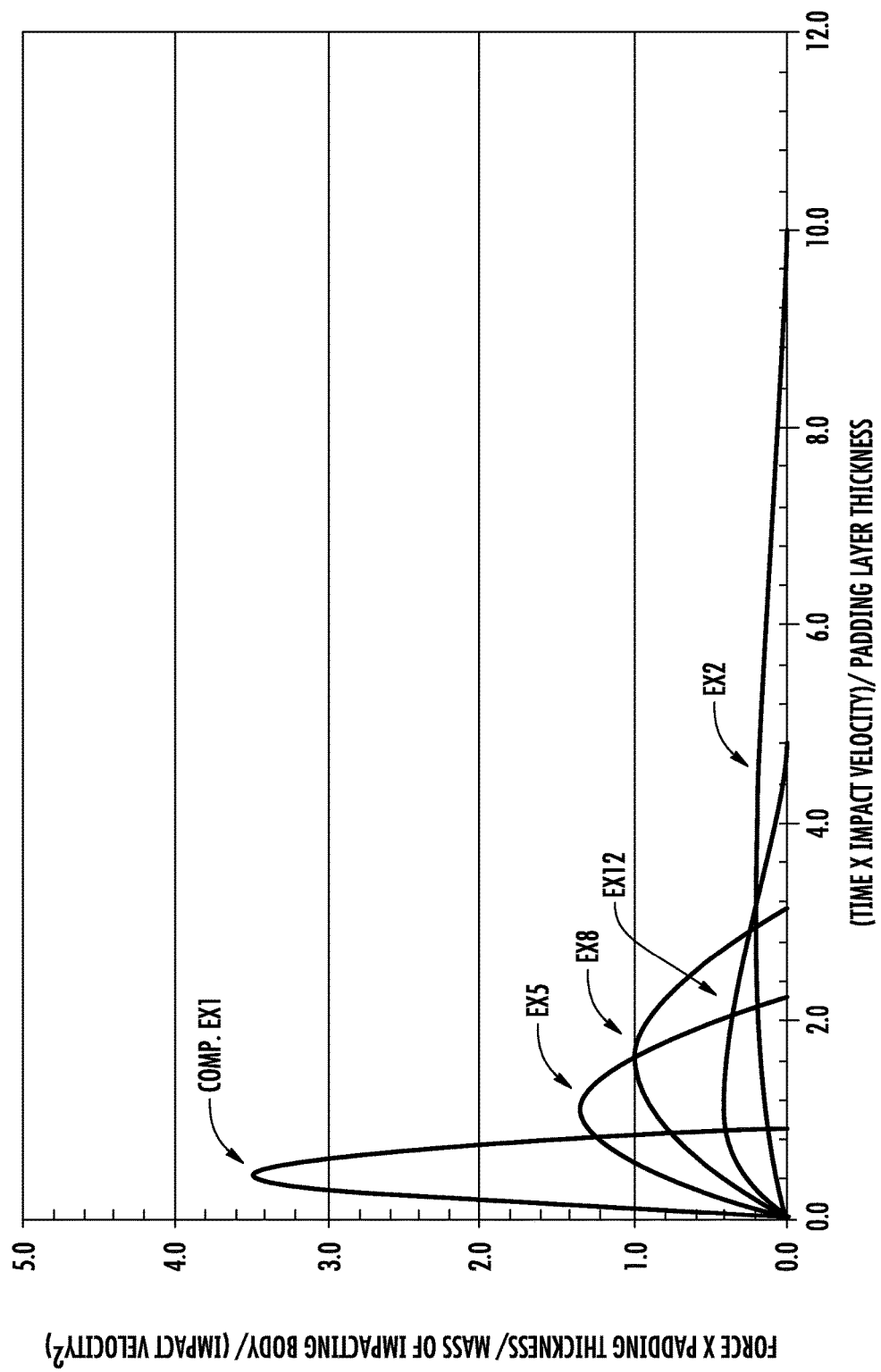
FIG. 8 is a graph of select impact resistant buffer tube example models showing the time response and force distribution of those buffer tubes under impact compared to a standard polypropylene buffer tube.

Referring to FIGS. 7 and 8, in various embodiments, buffer tube 20 and or buffer tube 50 may be configured (e.g., through selection of thickness, materials with particularly material properties, external shapes, shapes of internal channel shape, etc.) to protect optical fibers 18 from damage under impact loading (e.g., short duration, high force loading). In such embodiments, the behavior of the buffer tube under impact, and specifically how the buffer tube transfers the impact force to the optical fibers can be modeled as shown in FIG. 7, and the properties of a buffer tube meeting various impact performance parameters can be selected in accordance with the modeling. Similarly, it can be determined, through testing in accordance with the model, whether a given buffer tube design (e.g., a buffer tube of particular size, shape, thickness, material, etc.) includes one or more of the modeled elements with one or more of the performance parameters discussed below (e.g., impaction factor, response time of modeled Maxwell element, response time of modeled Kelvin element, etc.).

The viscoelastic and creep behavior of buffer tubes under an impact load has been modeled using the system 100 illustrated in FIG. 7. The impactor 102 has a mass $M_1$ and impacts the buffer tube 20 with a velocity $V_0$. The cushioning effect of buffer tube 20 has been modeled by considering buffer tube of thickness, $\delta$ (delta), and mass $M_2$ as a Burgers material having a Kelvin element 104 and a Maxwell element 106 in series. As will be generally understood, Kelvin element 104 describes the properties and the behavior of a cushioning buffer tube in response to an impact when the buffer tube is in the creep deformation region, and Maxwell element 106 describes the properties and the behavior of a cushioning buffer tube in response to an impact when the buffer tube is in the elastic deformation region.

The Kelvin element 104 is described as comprised of a spring 108 and a dashpot 110 (also referred to herein as a dampener and or shock absorber) in parallel. The Kelvin element spring 108 has a spring constant, $K_1$ equal to the modulus of elasticity of the Kelvin element of the buffer tube material in the creep deformation region, and the dashpot 110 of the Kelvin element 104 has a dashpot constant $C_1$ equal to the viscosity of the Kelvin element of the buffer tube material in the creep deformation region.

The Maxwell element 106 is described as comprised of a spring 112 and a dashpot 114 in series. The Maxwell element spring 112 has a spring constant $K_2$ equal to the modulus of elasticity of the Maxwell element of the buffer tube material in the elastic region, and the Maxwell element dashpot 114 has a dashpot constant $C_2$ equal to the viscosity of the Maxwell element of the buffer tube material in the plastic deformation region. It should be understood that FIG. 7 describes the behavior of a single layer buffer tube such as buffer tube 20. However, a model describing a multilayer buffer tube, such as buffer tube 50, will include additional sets of Kelvin and Maxwell elements (similar to elements 104 and 106) for each additional material layer of the buffer tube.

The overall mass of coated optical fibers 18 and surfaces being cushioned by the buffer tubes is $M_3$. The viscoelastic behavior of the coated optical fiber(s) 18 has been modeled by considering the coated optical fiber(s) within buffer tube 20 as a Kelvin element 116 having a spring 118 and dashpot 120 in parallel. The optical fiber Kelvin element spring 118 has a spring constant $K_3$ equal to the modulus of elasticity of the Kelvin element of the coated optical fiber(s) in the viscoelastic region, and the optical fiber Kelvin element dashpot has a dashpot constant, $C_3$, equal to the viscosity of the Kelvin element of the coated optical fiber in the viscoelastic region.

The terms x1 and x2 refer to the displacement of $M_2$ and $M_3$ from their initial positions, respectively. It is understood that the spring and dashpots constants for the Kelvin and Maxwell elements of the buffer tube material and for the Kelvin element of the coated optical fiber can be determined by one skill in the art by analyzing the creep and viscoelastic response of the particular materials used to form a given buffer tube or coated optical fiber, for example using tensile testing or DMA for measuring properties as a function of shear rate. The coated optical fibers in the examples shown below include a glass core and glass cladding that together has an outer diameter of glass of 125 microns and an optical fiber polymer coating that has an outer diameter of about 250 microns. Additional examples utilize an optical fiber polymer coating having an outer diameter of about 200 microns.

Using the representative system model 100 as shown in FIG. 7, deformation of buffer tube, force imparted by the buffer tube on the coated optical fibers and the energy absorbed by the buffer tube can be calculated, based on various buffer tube and optical fiber configurations. In various embodiments, the choice of material for buffer tube 20 acts to protect optical fiber(s) 18 by reducing the force, F, imparted by buffer tube 20 onto the coated fiber(s) 18 as a result of the impact from impactor 102 on buffer tube 20. The cushioning effect (e.g., the force reduction) provided by buffer tube 20 is related to the impaction factor, $\rho$ (rho), which is set forth in Equation 1 below, for a buffer tube of a given thickness:

$$\rho = \frac{F}{M_1 V_0^2} \qquad \text{Equation 1}$$

Tables 1A-1C below provide the output of system model 100 for various examples of cushioning buffer tubes 20, based on different values of $K_1$, $K_2$, $K_3$, $C_1$, $C_2$, and $C_3$. As will be understood, based on the information in Tables 1A-1C, a person of skill in the art can configure a cushioning buffer tube (e.g., through design/selection of materials, buffer tube size, shape, etc.) to provide specific and selected impact performance represented by $\rho$ (rho) and/or various time responses for the different modeled elements of the buffer tube as shown in the tables below. Table 2 below provides comparative examples of buffer tubes formed from conventional buffer tube materials. As shown in Tables 1 and 2 below, system model 100 is used to determine the impaction parameter $\rho$ for buffer tube materials having different combinations of Kelvin element 104 and Maxwell element 106 parameters $K_1$ and $K_2$ {reported in units of Pascal (Pa [$10^{-6}$ MPa])} and $C_1$ and $C_2$ {reported in units of Pascal seconds (Pa·s [$10^{-6}$ MPa·s])}. The tables also show the response times for the different modeled elements of buffer tube examples having different combinations of Kelvin element 104 and Maxwell element 106 parameters $K_1$, $K_2$, $C_1$ and $C_2$. The tables also show the modulus of the Kelvin element 116 of the coated optical fiber(s) 18 in the viscoelastic region, $K_3$, in Pa, as well as viscosity of the Kelvin element of the coated optical fiber(s) 18 in the visco-elastic region, $C_3$, in Pa·s. The data in tables 1 and 2 below is modeled for materials at room temperature (e.g., about 20-25 degrees C.).

TABLE 1A

Cushioning Buffer Tube Examples

| Cushioning Buffer Tube Examples | Buffer tube wall thickness, cm | Viscosity of the Kelvin element of the buffer tube material in the creep deformation region, C1, Pa · s | Viscosity of the Maxwell element of the buffer tube material in the elastic deformation region, C2, Pa · s | Viscosity of the Kelvin element of the coated optical fibers in the visco-elastic region, C3, Pa · s |
|---|---|---|---|---|
| 1 | 0.05 | 4.00E+03 | 6.00E+03 | 1.00E+07 |
| 2 | 0.05 | 4.00E+03 | 6.00E+03 | 1.00E+07 |
| 3 | 0.05 | 1.60E+04 | 2.40E+04 | 1.00E+07 |
| 4 | 0.05 | 3.60E+04 | 5.40E+04 | 1.00E+07 |
| 5 | 0.05 | 4.00E+05 | 6.00E+05 | 1.00E+07 |
| 6 | 0.05 | 4.20E+07 | 1.21E+09 | 1.00E+07 |

TABLE 1A-continued

Cushioning Buffer Tube Examples

| Cushioning Buffer Tube Examples | Buffer tube wall thickness, cm | Viscosity of the Kelvin element of the buffer tube material in the creep deformation region, C1, Pa·s | Viscosity of the Maxwell element of the buffer tube material in the elastic deformation region, C2, Pa·s | Viscosity of the Kelvin element of the coated optical fibers in the visco-elastic region, C3, Pa·s |
|---|---|---|---|---|
| 7 | 0.05 | 4.20E+06 | 1.21E+08 | 1.00E+07 |
| 8 | 0.05 | 1.00E+08 | 1.00E+08 | 1.00E+07 |
| 9 | 0.05 | 1.00E+07 | 1.00E+07 | 1.00E+07 |
| 10 | 0.05 | 1.00E+06 | 1.00E+06 | 1.00E+07 |
| 11 | 0.05 | 1.00E+05 | 1.00E+05 | 1.00E+07 |
| 12 | 0.05 | 1.00E+04 | 1.00E+04 | 1.00E+07 |
| 13 | 0.05 | 1.00E+08 | 1.00E+08 | 1.00E+07 |
| 14 | 0.05 | 1.00E+07 | 1.00E+07 | 1.00E+07 |
| 15 | 0.05 | 1.00E+06 | 1.00E+06 | 1.00E+07 |
| 16 | 0.05 | 1.00E+05 | 1.00E+05 | 1.00E+07 |
| 17 | 0.05 | 1.00E+04 | 1.00E+04 | 1.00E+07 |

TABLE 1B

Cushioning Buffer Tube Examples

| Cushioning Buffer Tube Examples | Modulus of the Kelvin element of the buffer tube material in the creep deformation region, K1, Pa | Modulus of the Maxwell element of the buffer tube material in the elastic deformation region, K2, Pa | Modulus of the Kelvin element of the coated optical fibers in the visco-elastic region, K3, Pa |
|---|---|---|---|
| 1 | 1.00E+07 | 1.00E+07 | 5.00E+07 |
| 2 | 2.00E+07 | 2.00E+07 | 5.00E+07 |
| 3 | 4.00E+07 | 4.00E+07 | 5.00E+07 |
| 4 | 6.00E+07 | 6.00E+07 | 5.00E+07 |
| 5 | 2.00E+07 | 2.00E+08 | 5.00E+07 |
| 6 | 6.37E+08 | 1.22E+08 | 5.00E+07 |
| 7 | 6.37E+08 | 1.22E+08 | 5.00E+07 |
| 8 | 1.00E+08 | 1.00E+08 | 5.00E+07 |
| 9 | 1.00E+08 | 1.00E+08 | 5.00E+07 |
| 10 | 1.00E+08 | 1.00E+08 | 5.00E+07 |
| 11 | 1.00E+08 | 1.00E+08 | 5.00E+07 |
| 12 | 1.00E+08 | 1.00E+08 | 5.00E+07 |
| 13 | 1.00E+07 | 1.00E+07 | 5.00E+07 |
| 14 | 1.00E+07 | 1.00E+07 | 5.00E+07 |
| 15 | 1.00E+07 | 1.00E+07 | 5.00E+07 |
| 16 | 1.00E+07 | 1.00E+07 | 5.00E+07 |
| 17 | 1.00E+07 | 1.00E+07 | 5.00E+07 |

TABLE 1C

Cushioning Buffer Tube Examples

| Cushioning Buffer Tube | Response time of Kelvin element of the buffer tube material, C1/K1, seconds | Response time of Maxwell element of the buffer tube material, C2/K2, seconds | Maximum $\phi$ [=Force that buffer tube imparts to coated optical fibers · Padding Thickness/(Impactor Mass/(Impactor Velocity$^2$)] | Maximum $\rho$ [=Force that buffer tube imparts to coated optical fibers/Impactor Mass/(Impactor Velocity$^2$)], 1/m |
|---|---|---|---|---|
| 1 | 0.0004 | 0.0006 | 0.17 | 342 |
| 2 | 0.0002 | 0.0003 | 0.21 | 420 |
| 3 | 0.0004 | 0.0006 | 0.43 | 860 |
| 4 | 0.0006 | 0.0009 | 0.62 | 1240 |
| 5 | 0.0020 | 0.0030 | 1.37 | 2740 |
| 6 | 0.0659 | 9.93 | 1.12 | 2240 |
| 7 | 0.0066 | 0.99 | 1.10 | 2200 |
| 8 | 1.0000 | 1.00 | 1.01 | 2020 |
| 9 | 0.1000 | 0.10 | 1.01 | 2016 |
| 10 | 0.0100 | 0.01 | 0.99 | 1988 |

TABLE 1C-continued

Cushioning Buffer Tube Examples

| Cushioning Buffer Tube | Response time of Kelvin element of the buffer tube material, C1/K1, seconds | Response time of Maxwell element of the buffer tube material, C2/K2, seconds | Maximum $\phi$ [=Force that buffer tube imparts to coated optical fibers · Padding Thickness/Impactor Mass/(Impactor Velocity$^2$)] | Maximum $\rho$ [=Force that buffer tube imparts to coated optical fibers/Impactor Mass/(Impactor Velocity$^2$)], 1/m |
|---|---|---|---|---|
| 11 | 0.0010 | 0.001 | 0.87 | 1748 |
| 12 | 0.0001 | 0.0001 | 0.43 | 858 |
| 13 | 10.0 | 10.0 | 0.32 | 638 |
| 14 | 1.0000 | 1.00 | 0.32 | 638 |
| 15 | 0.1000 | 0.10 | 0.32 | 636 |
| 16 | 0.0100 | 0.01 | 0.30 | 608 |
| 17 | 0.0010 | 0.001 | 0.22 | 432 |

TABLE 2A

Comparative Buffer Tube Examples

| Comparative Buffer Tube Examples | Buffer tube wall thickness, cm | Viscosity of the Kelvin element of the buffer tube material in the creep deformation region, C1, Pa · s | Viscosity of the Maxwell element of the buffer tube material in the elastic deformation region, C2, Pa · s | Viscosity of the Kelvin element of the coated optical fibers in the visco-elastic region, C3, Pa · s |
|---|---|---|---|---|
| 1-Polypropylene | 0.05 | 4.20E+08 | 1.21E+10 | 1.00E+07 |
| 2-PBT-PTMG copolymer | 0.05 | 4.20E+08 | 1.21E+10 | 1.00E+07 |

TABLE 2B

Comparative Buffer Tube Examples

| Comparative Buffer Tube Examples | Modulus of the Kelvin element of the buffer tube material in the creep deformation region, K1, Pa | Modulus of the Maxwell element of the buffer tube material in the elastic deformation region, K2, Pa | Modulus of the Kelvin element of the coated optical fibers in the visco-elastic region, K3, Pa |
|---|---|---|---|
| 1-Polypropylene | 6.37E+09 | 1.22E+09 | 5.00E+07 |
| 2-PBT-PTMG copolymer | 1.27E+09 | 2.44E+08 | 5.00E+07 |

TABLE 2C

Comparative Buffer Tube Examples

| Comparative Buffer Tube Examples | Response time of Kelvin element of the buffer tube material, C1/K1, seconds | Response time of Maxwell element of the buffer tube material, C2/K2, seconds | Maximum $\phi$ [=Force that buffer tube imparts to coated optical fibers · Padding Thickness/Impactor Mass/(Impactor Velocity$^2$)] | Maximum $\rho$ [=Force that buffer tube imparts to coated optical fibers/Impactor Mass/(Impactor Velocity$^2$)], 1/m |
|---|---|---|---|---|
| 1-Polypropylene | 0.066 | 9.926 | 3.53 | 7060 |
| 2-PBT-PTMG copolymer | 0.330 | 49.63 | 1.58 | 3160 |

As can been seen from a comparison of Table 1C and Table 2C, the response times of the Kelvin element, the Maxwell elements and/or the impaction factor, $\rho$ (rho), for many of the different cushioning buffer tube examples are substantially less than the comparative buffer tubes formed from standard buffer tube materials. FIG. 8 shows a plot of $\phi$ (phi) for select buffer tube examples as well as for the polypropylene comparative example versus ((time×impact velocity)/padding layer thickness). It should be noted in the tables above and FIG. 8, padding thickness is the buffer tube wall thickness. Applicant believes that, at least in some embodiments, the identified response times and impaction factor are related to ability of the buffer tube to protect the optical fibers 18 under crush events, and particularly under short duration, high load events, such as impact events experienced during the different installation processes discussed above. It should be understood that the data in the tables above is based on a buffer tube having a wall thickness of 0.05 cm.

Thus, in some embodiments, buffer tubes 20 are configured such that the impact on the buffer tube results in a force F imparted by the buffer tube on the coated optical fibers corresponding to the impaction parameter $\rho$ of less than or equal to 2800 $m^{-1}$. In some other embodiments, buffer tubes 20 are configured such that the impact on the buffer tube results in a force F imparted by the buffer tube on the coated optical fibers corresponding to the impaction parameter $\rho$ of less than or equal to 1000 $m^{-1}$. In still other embodiments, buffer tubes 20 are configured such that the impact on the buffer tube results in a force F imparted by the buffer tube on the coated optical fibers corresponding to the impaction parameter $\rho$ of less than or equal to 500 $m^{-1}$.

In still other embodiments yet, buffer tubes 20 are configured such that the impact on the buffer tube results in a force F imparted by the buffer tube on the coated optical fibers corresponding to the impaction parameter $\rho$ of greater than or equal to 100 $m^{-1}$, specifically 100 $m^{-1} \leq \rho \leq 2800$ $m^{-1}$, and more specifically 100 $m^{-1} \leq \rho \leq 1000$ $m^{-1}$.

In some embodiments, the modulus of elasticity of the material of buffer tube 20 in the elastic region ($K_2$) is less than or equal to 200 MPa. In some other embodiments, the modulus of elasticity of the material of buffer tube 20 in the elastic region ($K_2$) is less than or equal to 100 MPa. In still other embodiments, the modulus of elasticity of the material of buffer tube 20 in the elastic region ($K_2$) is less than or equal to 50 MPa. In still other embodiments yet, the modulus of elasticity of the material of buffer tube 20 in the elastic region ($K_2$) is greater than or equal to 10 MPa. In some embodiments, the modulus of elasticity of the material of buffer tube 20 falls within the range 10 MPa$\leq K_2 \leq$150 MPa, and specifically in the range 10 MPa$\leq K_2 \leq$50 MPa.

In some embodiments, the response time of the Maxwell element of the material of buffer tube 20 ($C_2/K_2$) is less than or equal to 1 sec. In some other embodiments, the response time of the Maxwell element of the material of buffer tube 20 ($C_2/K_2$) is less than or equal to 0.1 sec. In still other embodiments, the response time of the Maxwell element of the material of buffer tube 20 ($C_2/K_2$) is less than or equal to 0.01 sec. In still other embodiments yet, the response time of the Maxwell element of the material of buffer tube 20 ($C_2/K_2$) is less than or equal to 0.001 sec. In still other embodiments yet, the response time of the Maxwell element of the material of buffer tube 20 ($C_2/K_2$) is less than or equal to 0.0001 sec, specifically is 0.0001 sec.$\leq C_2/K_2 \leq$1 sec, and more specifically is 0.0001 sec.$\leq C_2/K_2 \leq$0.01 sec.

In some embodiments, the response time of the Kelvin element of the material of buffer tube 20 ($C_1/K_1$) is less than or equal to 1 sec. In some other embodiments, the response time of the Kelvin element of the material of buffer tube 20 ($C_1/K_1$) is less than or equal to 0.1 sec. In still other embodiments, the response time of the Kelvin element of the material of buffer tube 20 ($C_1/K_1$) is less than 0.01 sec. In still other embodiments yet, the response time of the Kelvin element of the material of buffer tube 20 ($C_1/K_1$) is less than or equal to 0.001 sec. In still other embodiments yet, the response time of the Kelvin element of the material of buffer tube 20 ($C_1/K_1$) is less than or equal to 0.0001 sec, specifically is 0.0001 sec.$\leq C_1/K_1 \leq$1 sec, and more specifically is 0.0001 sec.$\leq C_1/K_1 \leq$0.01 sec. In various embodiments, buffer tubes 20 may be formed from materials having any combination or sub-combination of properties (e.g., thickness, modulus of elasticity, hardness, Maxwell response time, Kelvin response time, impaction factor, etc.) discussed herein.

FIG. 8 is a graph for several of the examples from Tables 1 and 2 of Force×Padding Thickness/Mass of Impacting Body/(Impact Velocity$^2$) as a function of (Time×Impact Velocity)/Padding Layer Thickness. The results are plotted for the first cycle of impact of buffer tube on the coated fiber and shows the maximum $\phi$ (phy)=$\rho$*padding thickness is less than 2 (about 0.2 to about 1.4) for the select cushioned buffer tube examples shown, and in contrast, the maximum 4) for the comparative example polypropylene buffer tube is greater than 3 (3.53). The results also show that the select cushioned buffer tube examples shown also distribute the force over a broader time scale (better force dampening) and are significantly better than the comparative polypropylene and PBT-PTMG examples.

While the specific cable embodiments discussed herein and shown in the figures relate primarily to cables and core elements that have a substantially circular cross-sectional shape defining substantially cylindrical internal lumens, in other embodiments, the cables and core elements discussed herein may have any number of cross-section shapes. For example, in various embodiments, the cable jacket and/or buffer tubes may have a square, rectangular, triangular or other polygonal cross-sectional shape. In such embodiments, the passage or lumen of the cable or buffer tube may be the same shape or different shape than the shape of the cable jacket and/or buffer tubes. In some embodiments, the cable jacket and/or buffer tubes may define more than one channel or passage. In such embodiments, the multiple channels may be of the same size and shape as each other or may each have different sizes or shapes.

The optical fibers discussed herein may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended include one or more than one component or element, and is not intended to be construed as meaning only one.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical cable comprising:
   a cable body including an inner surface defining a channel within the cable body; and
   a plurality of tubes each including an outer surface, an inner surface and a channel defined by the inner surface of the tube, wherein each tube includes a first layer formed from a first polymer material, the first layer defining the inner surface of the tube; and
   a plurality of optical fibers located within the channel of each tube, wherein each optical fiber includes an optical core surrounded by cladding of a different refractive index than the optical core, the cladding surrounded by a fiber coating layer, and wherein each optical fiber has fiber radius defined from a center point of the optical core to an outer surface of the fiber coating layer, wherein a thickness of the first layer of each of the plurality of tubes in the radial direction is greater than the fiber radius;
   wherein the modulus of elasticity of the first material of each of the plurality of tubes is a modulus in the elastic region and is less than 30 MPa, and wherein the fiber coating layer includes an inner coating layer that has a modulus of elasticity in the elastic region of less than 5 MPa and an outer coating layer that has modulus of elasticity in the elastic region greater than 1000 MPa, wherein the channel of each of the plurality of tubes has a cross-sectional area, wherein the cross-sectional area of the channel of each of the tubes is at least twice a total cross-sectional area of all of the plurality of optical fibers located within each of the tubes.

2. The optical cable of claim 1 wherein each of the plurality of tubes further includes a second layer formed from a second material, located around and outside of the first layer, wherein the second material has a modulus of elasticity at least 10 times greater than the modulus of elasticity of the first layer.

3. The optical cable of claim 2 wherein the modulus of elasticity of the first material of each of the plurality of tubes is less than 30 MPa, wherein the modulus of elasticity of the second material of each of the plurality of tubes is greater than 500 Mpa, wherein a radial thickness of the first layer is equal to or greater than a radial thickness of the second material.

4. The optical cable of claim 3 wherein a radial thickness between inner and outer surfaces of each tube is between 0.25 mm and 0.5 mm.

5. The optical cable of claim 3 wherein the first material of the first layer is at least one of a thermoplastic olefin, a thermoplastic urethane, a thermoplastic copolyester and a thermoplastic polyamide, wherein the second material of the second layer is polypropylene, wherein material of the fiber coating layer is a UV cured polymer layer.

* * * * *